(12) United States Patent
Kawahara et al.

(10) Patent No.: US 8,077,979 B2
(45) Date of Patent: Dec. 13, 2011

(54) APPARATUS AND METHOD FOR PATTERN RECOGNITION

(75) Inventors: Tomokazu Kawahara, Kanagawa-ken (JP); Osamu Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 12/401,300

(22) Filed: Mar. 10, 2009

(65) Prior Publication Data

US 2009/0232399 A1    Sep. 17, 2009

(30) Foreign Application Priority Data

Mar. 11, 2008  (JP) .................................. 2008-060990

(51) Int. Cl.
G06K 9/46    (2006.01)
H04H 60/32   (2008.01)

(52) U.S. Cl. ......................................... 382/190; 725/19

(58) Field of Classification Search .................. 382/159, 382/165, 170, 181, 187, 190, 229, 244, 251; 704/222, 230, 239, 256.8, 223, 243, 276; 707/749; 725/19; 700/131, 135; 706/20, 706/48

See application file for complete search history.

(56) References Cited

U.S. PATENT DOCUMENTS 4,959,870 A * 9/1990 Tachikawa ..................... 382/253
7,327,883 B2 * 2/2008 Polonowski .................. 382/182

OTHER PUBLICATIONS

Duda et al., "Pattern Classification," John Wiley & Sons, Inc. (2001), title and copyright pages only.
Cover et al., "Elements of Information Theory," John Wiley & Sons, Inc. (2006), title and copyright pages, and pp. 118-123.
Duda et al., "Principal Component Analysis (PCA)", Pattern Classification, Wiley-Interscience, Chapter 3, Section 3.8.1, pp. 115-117.
Lloyd. "Least Squares Quantization in PCM", IEEE Transactions on Information Theory, vol. IT-28, No. 2, pp. 129-137, (1982).

* cited by examiner

Primary Examiner — Abolfazl Tabatabai
(74) Attorney, Agent, or Firm — Finnegan, Henderson, Farabow, Garrett & Dunner, L.L.P.

(57) ABSTRACT

A pattern recognition method comprises steps of inputting a pattern of a recognition object performing feature extraction from the input pattern to generate a feature vector, increasing the number of quantization in an order from quantization number 1 or quantization number 2 to calculate a quantization threshold of each of the quantization number, wherein the quantization threshold of quantization number (n+1) using a quantization threshold of quantization number n (n>=1) is calculated and a quantization function having a quantization threshold corresponding to quantization number S (S>n) is generated, quantizing each component of the feature vector of the input pattern using the quantization function to generate an input quantization feature vector having each of the quantized component, storing a dictionary feature vector of the recognition object, or a quantized dictionary feature vector in which each component of the dictionary feature vector of the pattern of a recognition object is quantized; calculating a similarity between the input quantization feature vector and the dictionary feature vector, or a similarity between the input quantization feature vector and the quantized dictionary feature vector; and recognizing the recognition object based on the similarity.

14 Claims, 12 Drawing Sheets

APPARATUS AND METHOD FOR PATTERN RECOGNITION

CROSS REFERENCE TO RELATED APPLICATION

This application is based upon and claims the benefit of priority from the Japanese Patent Application No. 2008-060990, filed on Mar. 11, 2008, the entire contents of which are incorporated herein by reference.

FIELD OF THE INVENTION

The invention relates to a pattern recognition apparatus which reduces memory of feature value, and a method thereof, suppressing degradation of recognition performance.

DESCRIPTION OF THE BACKGROUND

In pattern recognition, "Pattern classification, Richard O. Duda, Peter, E. Hart, David G. Stork, Wiley-Interscience" has disclosed a method of reducing memory of a feature vector, suppressing degradation of recognition performance.

Application of this reduction method provides a subspace where sum of the square error of the feature vector approximation by projection is at a minimum. Projection on the subspace allows us to reduce dimension of the feature vector and memory, keeping the square error of the whole feature vector small. Unlike a data compression, distance and angle between the feature vectors can be calculated in an approximate state without returning to the original condition.

However, the above mentioned reduction method poses a problem that the amount of memory of the feature vectors may not be sharply reduced, suppressing degradation of recognition performance, since the dimension of the subspace to be projected needs to be remained to some extent in order to maintain recognition performance.

SUMMARY OF THE INVENTION

The invention allows compression of feature vectors to reduce amount of memory, suppressing degradation of recognition performance, without returning to the original state.

An embodiment of the invention provides a pattern recognition apparatus which comprises a pattern input unit configured to input a pattern of a recognition object, a feature extraction unit configured to perform feature extraction from the input pattern to generate a feature vector, a function generation unit configured to increase the number of quantization in an order from quantization number 1 or quantization number 2 to calculate a quantization threshold of each of the quantization number, the function generation unit calculating the quantization threshold of quantization number (n+1) using a quantization threshold of quantization number n (n>=1) and generating a quantization function having a quantization threshold corresponding to quantization number S (S>n), a quantization unit configured to quantize each component of the feature vector of the input pattern using the quantization function to generate an input quantization feature vector having each of the quantized component, a dictionary unit configured to store a dictionary feature vector of the recognition object, or a quantized dictionary feature vector in which each component of the dictionary feature vector of the pattern of a recognition object is quantized, a similarity calculation unit configured to calculate a similarity between the input quantization feature vector and the dictionary feature vector, or a similarity between the input quantization feature vector and the quantized dictionary feature vector, and a determination unit configured to recognize the recognition object based on the similarity.

DETAILED DESCRIPTION OF THE INVENTION

Reference will now be made in detail to the present embodiments of the invention, embodiments of which are illustrated in the accompanying drawings. A pattern recognition apparatus of the embodiments of the invention will be explained with reference to the drawings as follows. The pattern recognition apparatus of the embodiments is not limited to pattern recognition of an image but may be applied to various fields of pattern recognitions where a feature value such as a sound is used.

First Embodiment

Pattern recognition apparatus 10 of this embodiment quantizes both an input feature vector corresponding to an input pattern and a dictionary feature vector which is a candidate for comparison, calculates a similarity, and performs pattern recognition based on the similarity.

Figure 1:
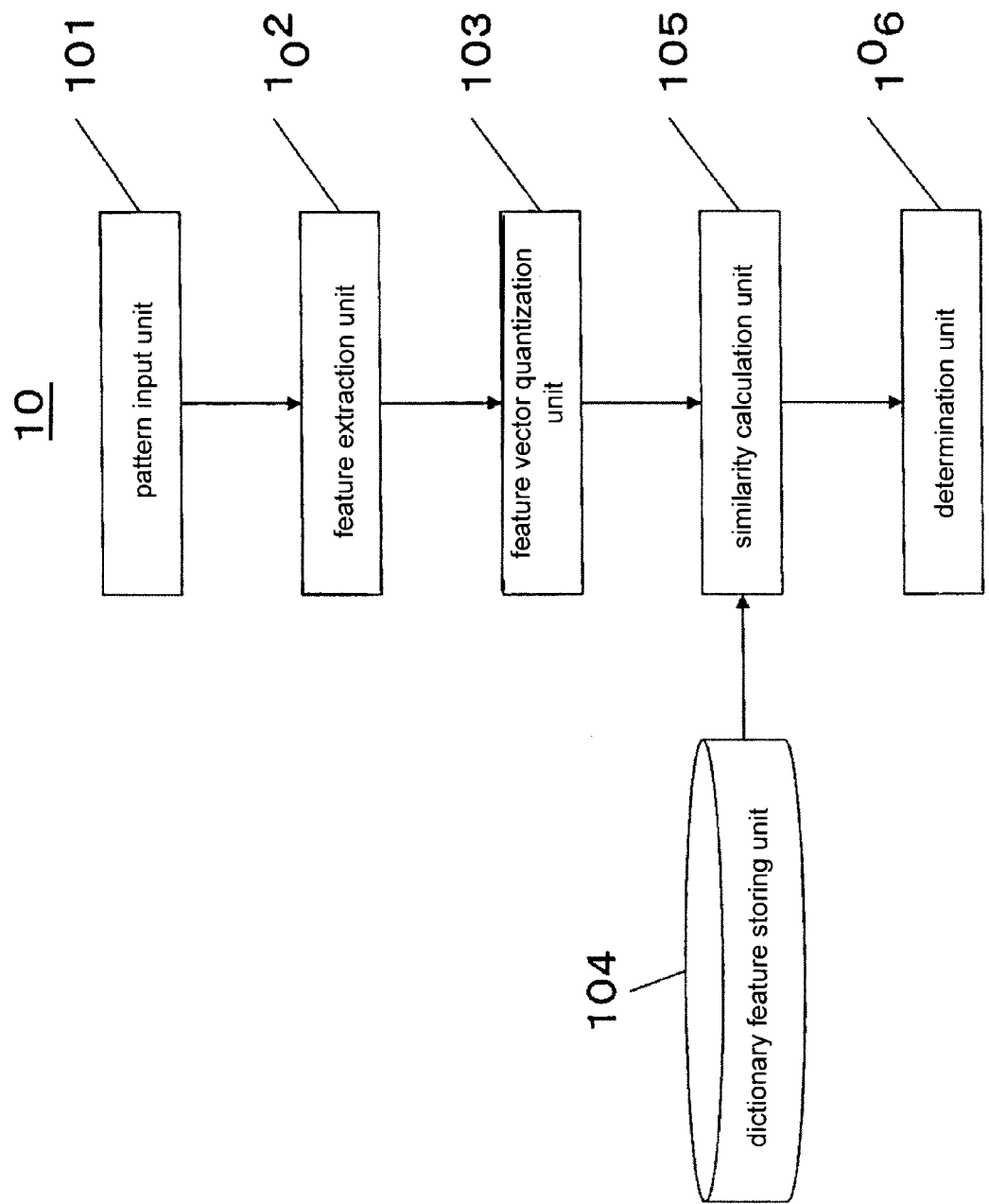
FIG. 1 is a block diagram of a pattern recognition apparatus according to the first embodiment of the invention.

Pattern recognition apparatus 10 of this embodiment will be explained with reference to FIG. 1. FIG. 1 is a schematic block diagram illustrating pattern recognition apparatus 10. Pattern recognition apparatus 10 comprises a pattern input unit 101, a feature extraction unit 102, a feature vector quantization unit 103, a dictionary feature storing unit 104, a similarity calculation unit 105, and a determination unit 106. Functions of each unit 101-106 may be realized by a program stored in a computer. Functions of each unit 101-106 will be explained below.

Pattern input unit 101 inputs the pattern to be used as a candidate for recognition. When the pattern is an image, an image captured by, for example, a digital camera may be input into a computer or an image captured by a camera connected to a computer may be input into the computer. When the pattern is a sound, for example, a recorded sound may be input into a computer or a sound recorded by a microphone connected to a computer may be input into the computer.

Feature extraction unit 102 extracts feature values from a pattern input by pattern input unit 101 and converts the pattern into a vector. Hereafter, the vector converted by feature extraction unit 102 is called a "feature vector." When the input pattern is an image, the pattern is changed into a vector by, for example, a raster scan. When the input pattern is a sound, for example, a vector which has frequency components of the sound within a definite period of time is used.

After converting into a vector, a processing of suppressing an input pattern change may be performed. For example, a processing of removing a noise component with a small eigen value obtained from the pattern prepared in large quantities beforehand by principal component analysis etc. may be performed.

Feature vector quantization unit 103 generates a quantization function for the feature vector (the input feature vector and the dictionary feature vector) generated by feature extraction unit 102, and performs quantization processing of each component of the feature vectors based on the quantization function. The "quantization function" is a function defined from a set of sections which is divided from a set of real numbers into limited numbers or countable infinite numbers, and a set of values corresponding to the sections one-to-one, and the function which outputs the value corresponding to the section containing the input real number for the input real number. The "quantization threshold" means the above section. The "quantization value" is the value corresponding to the quantization threshold one-to-one and is included in the quantization threshold. The "quantization feature vector" means a feature vector quantized by feature vector quantization unit 103.

Figure 2:
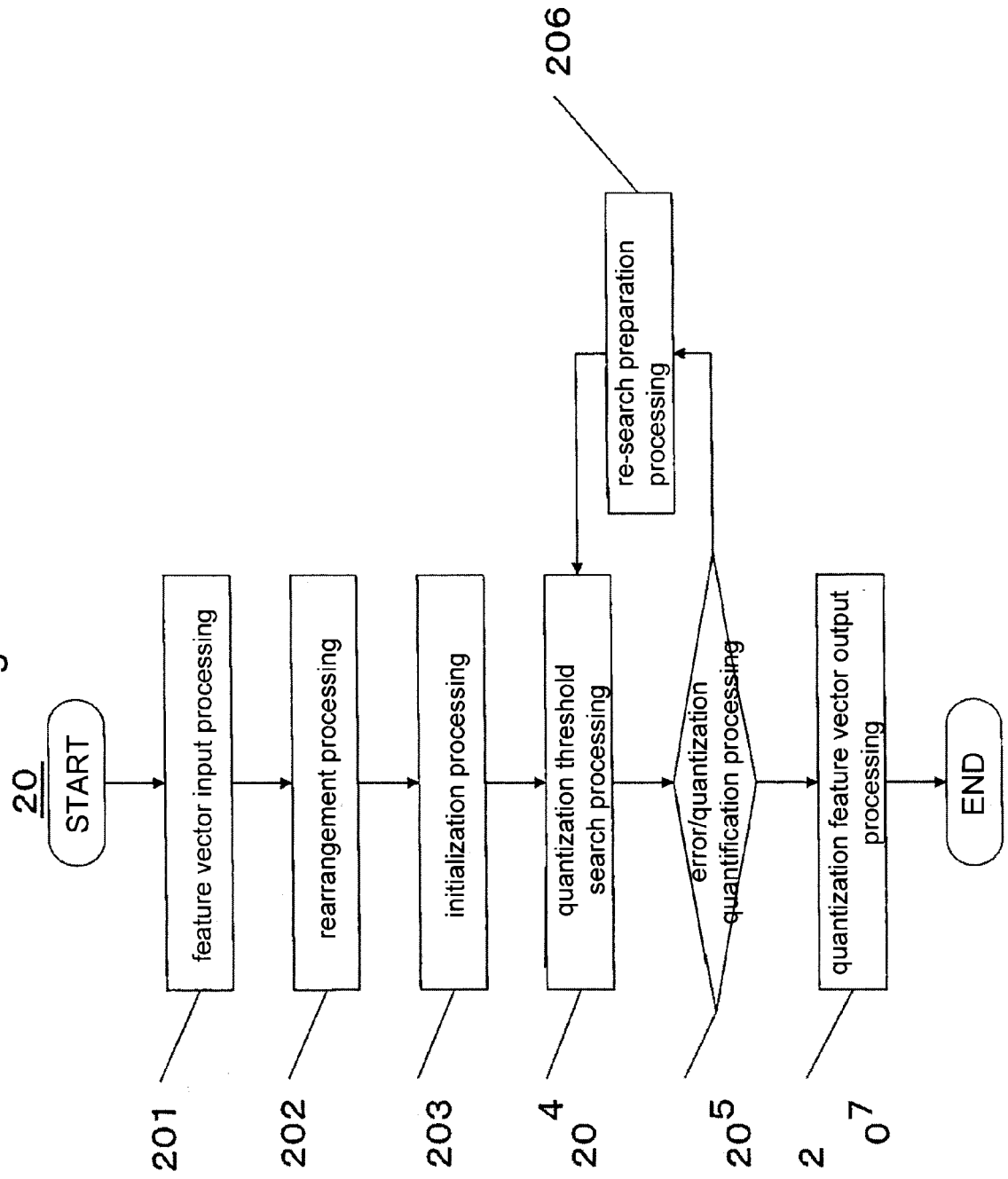
FIG. 2 is a flow chart of quantization processing.
Figure 7:
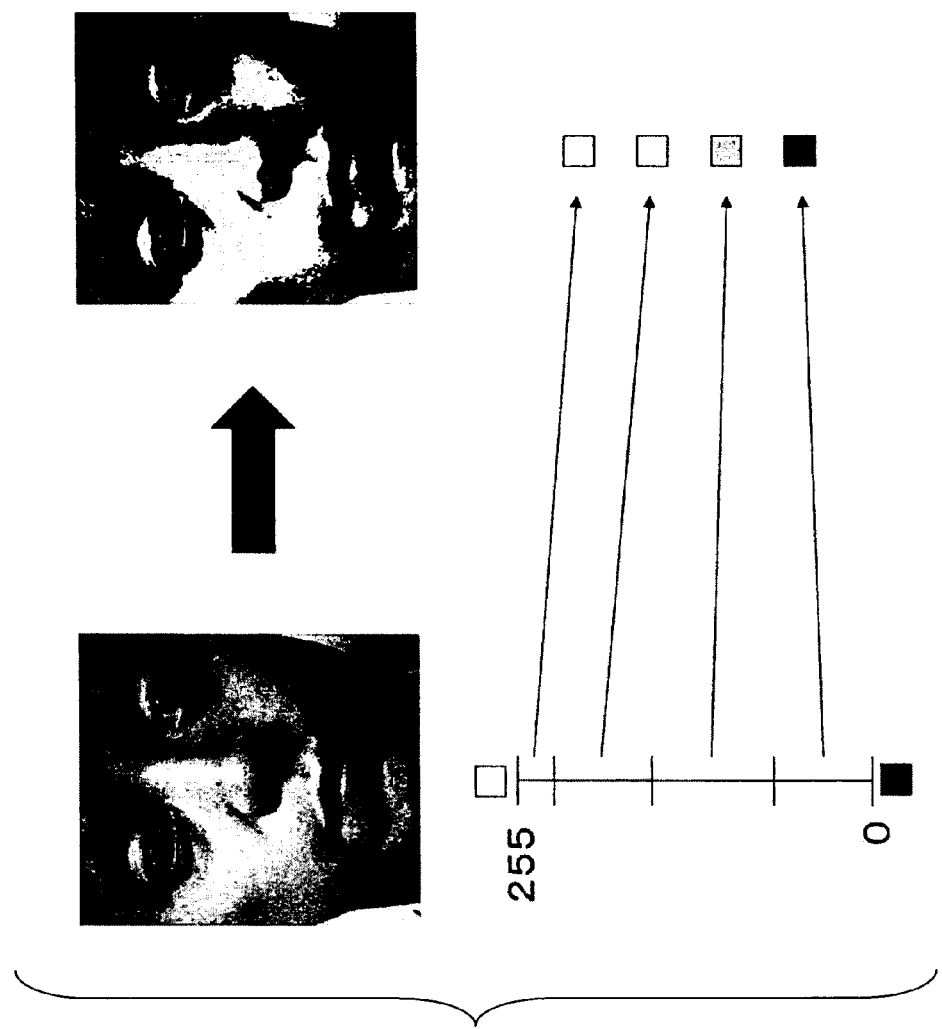
FIG. 7 is a view of a quantization processing of each component of a feature vector generated from a face image.

FIG. 2 is a flow chart of details of quantization processing 20 performed in feature vector quantization unit 103. Explanation for quantization processing 20 will be explained below. The image processed by quantization processing 20 for the feature vector generated from the face image is shown in FIG. 7.

Dictionary feature storing unit 104 extracts a dictionary feature vector for a pattern of each class for recognition by feature extraction unit 102, performs processing by feature vector quantization unit 103 and stores quantization feature vectors (hereinafter, referred to as "dictionary quantization feature vector") of the generated dictionary into a storage area. Similarity calculation unit 105 calculates a value indicating a similarity (hereinafter, referred to as "similarity") between a quantization feature vector of the input pattern generated by feature vector quantization unit 103 (hereinafter, referred to as "input quantization feature vector") and a dictionary quantization feature vector of each class stored in dictionary feature storing unit 104. Here, the distance between vectors is calculated.

Figure 3:
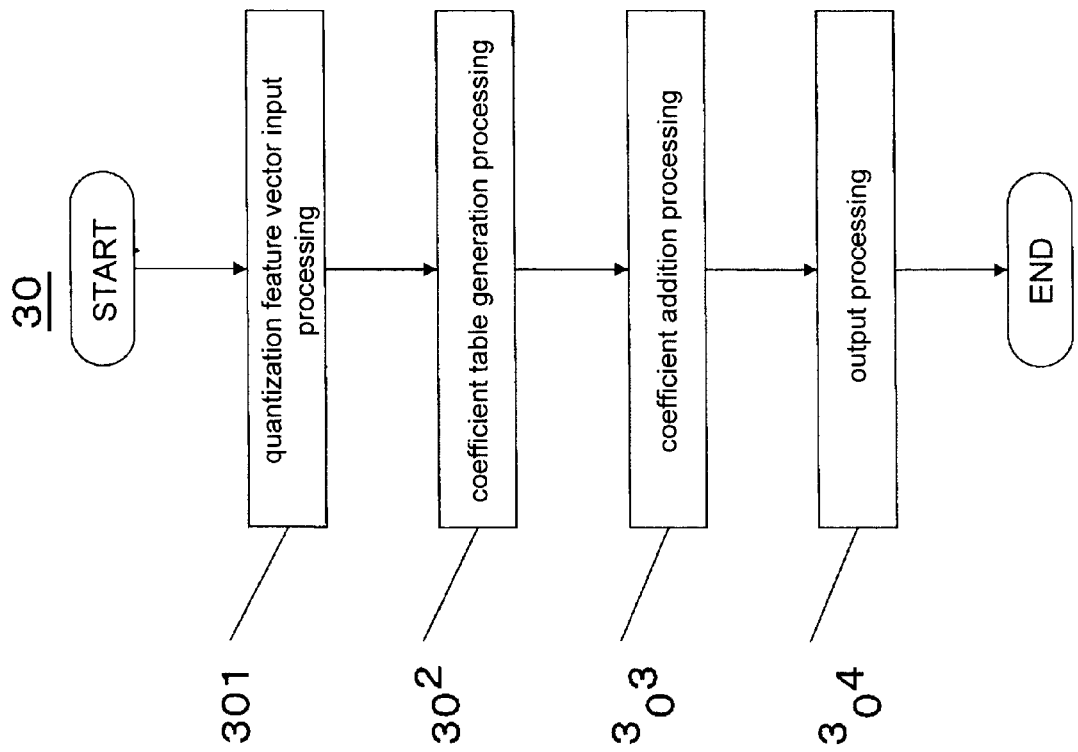
FIG. 3 is a flow chart of a similarity calculation processing.

FIG. 3 is a flow chart of a similarity calculation processing 30 performed by similarity calculation unit 105. Explanation of similarity calculation processing 30 is mentioned later. Determination unit 106 identifies the class for recognition, when the class has the highest similarity among the registered classes fulfilling conditions of the similarity. When no class fulfills the conditions, determination unit 106 identifies that there is no class in the class. When the distance between vectors is used as the similarity, the distance is set to be smaller than a predetermined threshold and has higher similarity as the distance becomes smaller.

Quantization processing 20 is a quantization processing performed by feature vector quantization unit 103. FIG. 2 is a flow chart of quantization processing 20. Quantization processing 20 includes a feature vector input processing 201, a rearrangement processing 202, an initialization processing 203, a quantization threshold search processing 204, an error/quantization quantification processing 205, a re-search preparation processing 206, and a quantization feature vector output processing 207. Explanation of each of the processing 201-207 is shown below.

Feature vector input processing 201 is a processing of inputting the feature vector (i.e., the input feature vector or the dictionary feature vector) output from feature extraction unit 102. Hereafter, the dimension of the feature space of the feature vector is set to D.

Rearrangement processing 202 is a processing of rearranging the size of the value of each component of the feature vectors into an ascending order. Hereafter, the feature vectors after rearrangement processing 202 is set to $(v_1, \ldots, v_D)$ $(1<=I<=j<=D)$.

Figure 8:
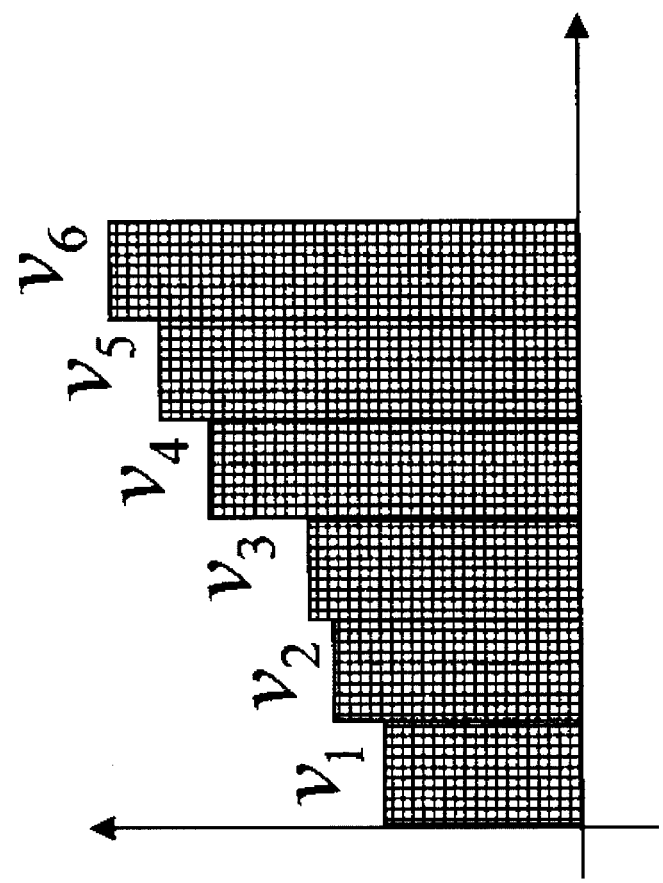
FIG. 8 is a view of a vector ($v_1$, $v_6$) rearranged when D=6.

FIG. 8 is a view of a rearranged vector $(v_1, \ldots, v_6)$ for D=6 (after rearrangement processing 202). In FIG. 8, a vertical axis is a size of the value of each component of the feature vectors, and a horizontal axis is the number of dimensions of each component.

Initialization processing 203 is a processing of initializing a loop processing by the number of quantization to perform quantization processing 20. Before explaining initialization processing, signs are defined $(1<=I<=j<=D)$.

"$e_{i,j}$" is the minimum error when quantizing $v_i, \ldots, v_j$ by quantization number 1. That is, it is the minimum value of the error when replacing it into q. q is a real number; however, it is an average m of $v_i, \ldots, v_j$ as mentioned later. The error is calculated by the square sum of the difference of each component as shown in the equation (1) described below.

Next, calculation of $e_{i,j}$ will be explained. The quantization error when replacing all $v_i, \ldots, v_j$ with q is shown in the equation (1) described below.

$$\sum_{k=i}^{j} (q - v_k)^2 = (j-i)(q-m)^2 + (j-i)\sigma^2 \qquad (1)$$

where m is an average value of $v_i, \ldots, v_j$, and $\sigma^2$ is distribution of $v_i, \ldots, v_j$.

According to equation (1), when q is an average m of $v_i, \ldots, v_j$, the quantization error is at the minimum, and the value is $(j-i)\sigma^2$.

Figure 9:
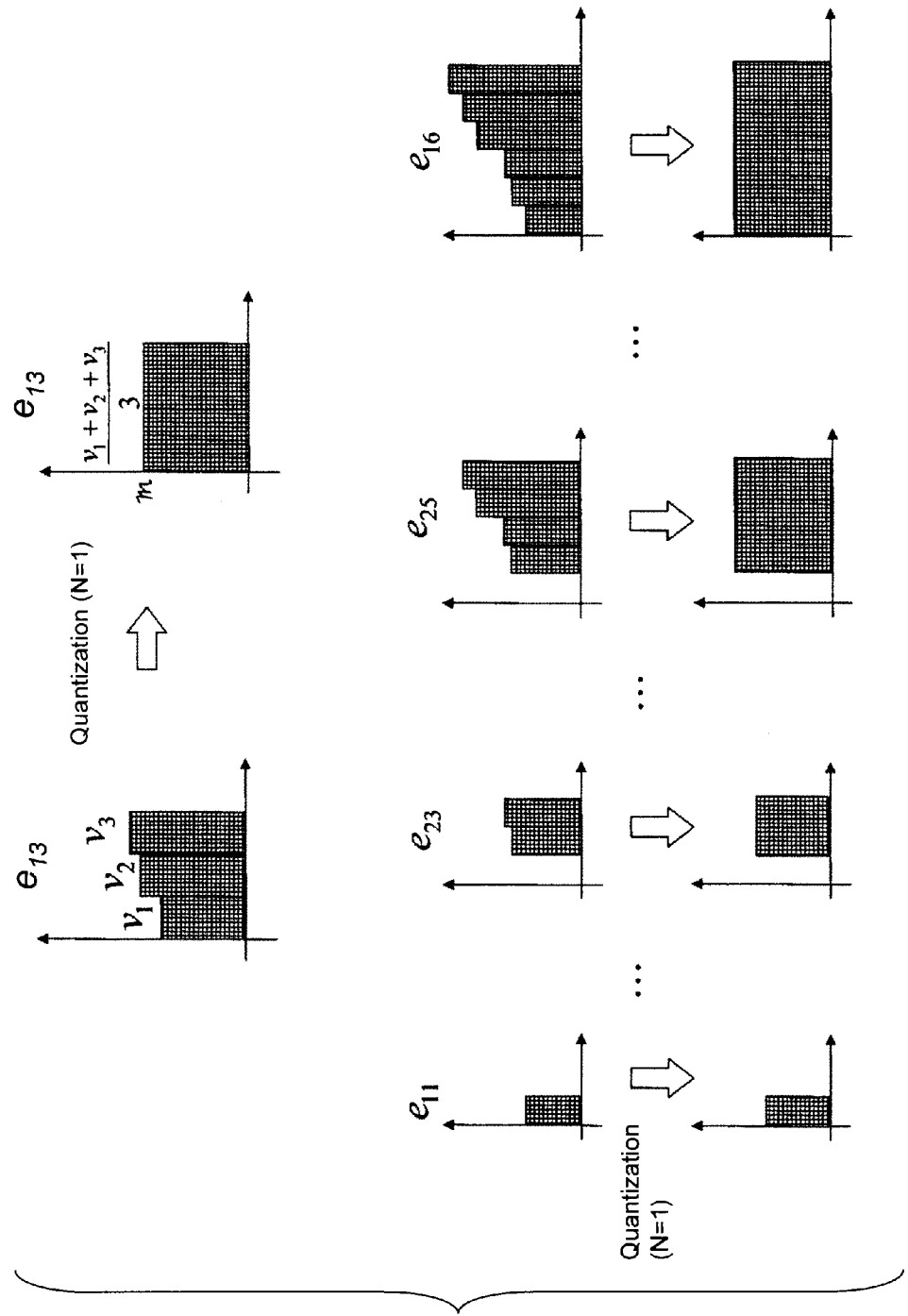
FIG. 9 is a view of $e_{i,j}$ of the vector of FIG. 8.

FIG. 9 is a view of $e_{i,j}$ of the vector of FIG. 8 (D=6). "$E_{i,M}$" is the minimum error when quantizing $v_i, \ldots, v_j$ by quantization number M.

Figure 10:
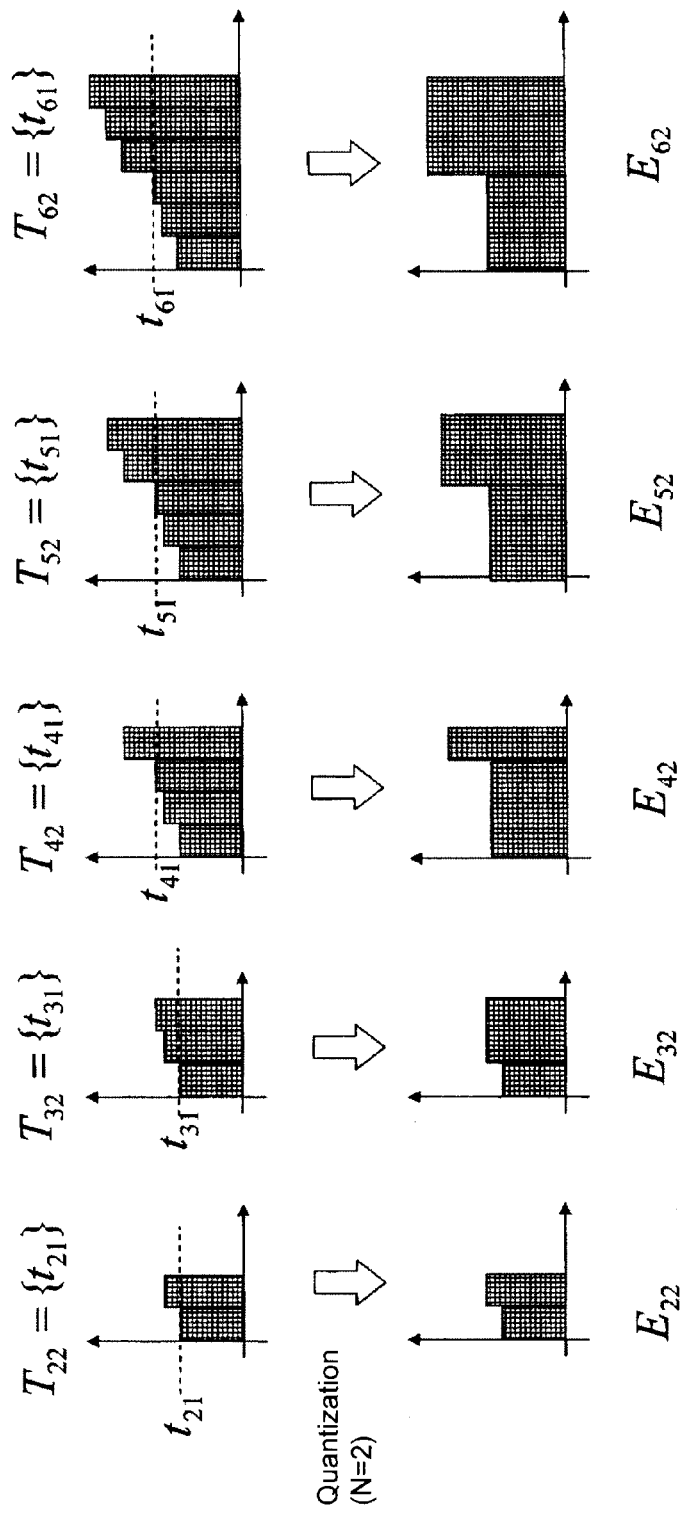
FIG. 10 is a view of vectors $E_{i,M}$ and $T_{i,M}$ of FIG. 8.

FIG. 10 is a view of the vector $E_{i,M}$ of FIG. 8. "$T_{i,M}$" is a set of division values of the quantization threshold, which is at the minimum when quantizing $v_i, \ldots, v_j$ by quantization number M. The quantization number of value a is defined as follows for the division value group Ti, M={$t_1, \ldots, t_{(M-1)}$}:

a quantization number is 1 for a<$t_1$,
a quantization number is i for $t_{(i-1)}<=a<t_i$, and
a quantization number is M for $t_{(M-1)}<=a$.

FIG. 10 is a view of vectors $E_{i,M}$ and $T_{i,M}$ of FIG. 8 (D=6, N=2). That is, $T_{22}, \ldots, T_{62}$ are a set of division values of the minimum binary quantization errors as shown in FIG. 10. As shown in FIG. 10, $E_{22}, \ldots, E_{62}$ are the binary quantization errors at that time. In each graph of FIG. 10, "the size of the value of each component of the feature vectors" of a vertical axis is divided by division value t, and each of the divided section is the quantization threshold. For example, there are two division values and three quantization thresholds, for quantization number N=3. "N" is the quantization number of the quantization function under processing.

Initialization processing 203 performs the following processing for each i=1, . . . , D. The first processing assigns an empty set to $T_{i,1}$. The second processing assigns the value of $e_{1,i}$ to Ei. The third processing assigns 1 to N.

The above-mentioned processing may be omitted and a processing of quantization threshold search processing 204 for N=2 as mentioned later may be initialization processing 203.

Quantization threshold search processing 204 is a processing of adding 1 to N and calculate $E_{D,N}$ and $T_{D,N}$ using $T_{i,(N-1)}$ and $E_{i,(N-1)}$ (i=N-1, ..., D). More specifically, the following processing is performed.

Calculate $$\alpha = \underset{(N-1) \leq i < D}{\arg\min} \{E_{i,(N-1)} + e_{(i+1),D}\}$$

Figure 11:
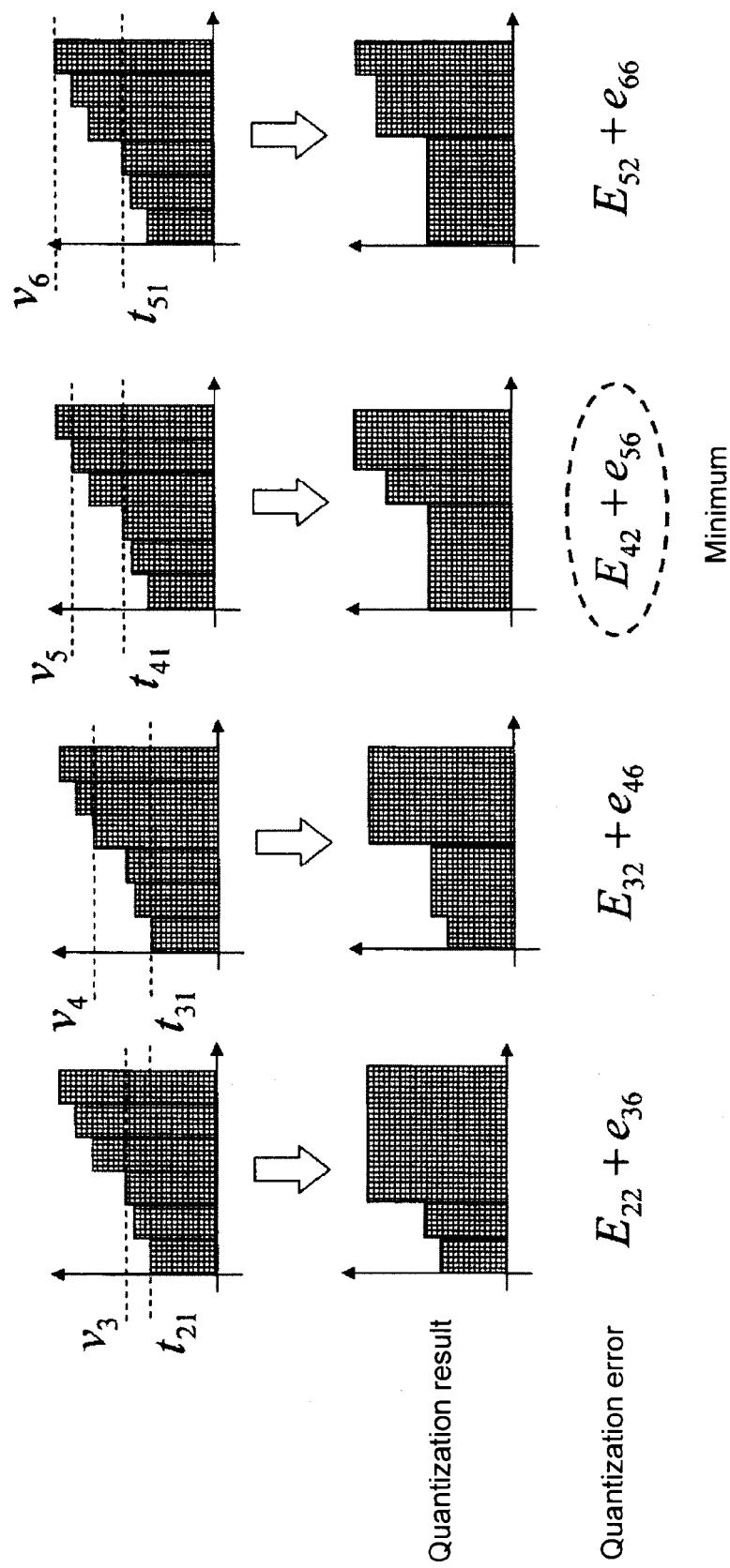
FIG. 11 is a view of the quantization threshold search processing 204 for the vector of FIG. 8 in a case where N=3.

Assign $T_{\alpha,(N-1)} \cup \{v_{(\alpha+1)}\}$ to $T_{D,N}$
Assign $E_{\alpha,(N-1)} + e_{(\alpha+1),D}$ to $E_{D,N}$ FIG. 11 illustrates quantization threshold search processing 204 of the vector of FIG. 8 for N=3. That is, the maximum division value is moved to $v_3, \ldots, v_6$ and calculates a quantization result with each division value to obtain each quantization error. As a division value which minimizes the quantization error of three-valued quantization, we let $t_{61}=t_{41}$ and $t_{62}=v_5$.

An error/quantization quantification processing 205 moves on to quantization feature vector output processing 207, when quantization error $E_{D,N}$ and quantization number N are evaluated and the quantization error and the quantization number meet the standard. On the other hand, when they do not meet the standard, the processing moves onto re-search preparation processing 206.

The standard may be "a quantization error is below a predetermined value." Also, the standard may be "a quantization number corresponds with a predetermined value" by calculating the quantization number from a desired compression rate.

Re-search preparation processing 206 is a processing of calculating $E_{j,N}$ and $T_{j,N}$ (=N, ..., (D-1)) using $T_{i,(N-1)}$ and $E_{i,(N-1)}$ (I=N-1, ..., D). More specifically, the following processing is performed for each j=N, ..., (D-1).

Calculate $$\beta = \underset{(N-1) \leq i < j}{\arg\min}\{E_{i,(N-1)} + e_{(i+1),j}\}$$

Figure 12:
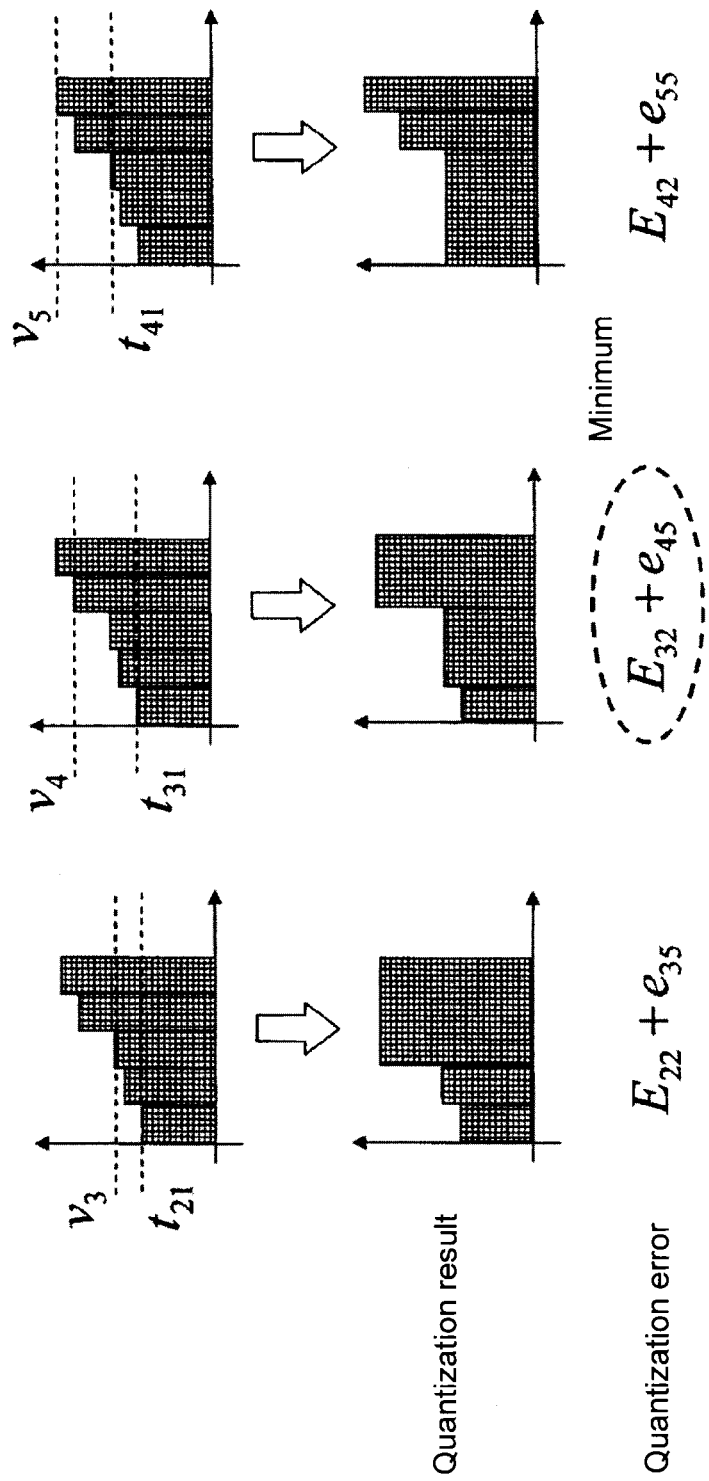
FIG. 12 is a view of re-search preparation processing 206 for the vector of FIG. 8 in a case where N=3 and i=5.

Assign $T_{\beta,(N-1)} \cup \{v_{(\beta+1)}\}$ to $T_{j,N}$
Assign $E_{\beta,(N-1)} + e_{(\beta+1),i}$ to $E_{j,N}$ FIG. 12 illustrates re-search preparation processing 206 of the vector of FIG. 8 for N=3 and i=5 to calculate $T_{53}=\{t_{51}, t_{52}\}$ and $E_{53}$. That is, the maximum division value is moved to $v_3, \ldots, v_5$ and calculates a quantization result with each division value to obtain each quantization error. As a division value which minimizes the quantization error of three-valued quantization of $v_1, \ldots, v_5$, we let $t_{51}=t_{31}$, $t_{52}=v_4$ and the minimum value be $E_{53}=E_{32}+e_{45}$.

Quantization feature vector output processing 207 uses the quantization function which is determined by a set of division values $T_{D,N}=\{t_1, \ldots, t_{(N-1)}\}$ of the quantization threshold which minimizes the quantization error and quantization values $m_1, \ldots, m_N$ (subscripts are quantization numbers), quantizes each component of the feature vectors to N values and outputs the quantization feature vector. We let the quantization function be a function of outputting the following value for input of real number x.

$M_1$ is output when $x < t_1$,
$m_i$ is output when $t_{(i-1)} <= x < t_i$,
$m_N$ is output when $t_{(N-1)} <= X$.

Similarity calculation processing 30 is a similarity calculation processing performed by similarity calculation unit 105. The flow chart of similarity calculation processing 30 is shown in FIG. 3.

Similarity calculation processing 30 includes quantization feature vector input processing 301, coefficient table generation processing 302, coefficient addition processing 303, and output processing 304. Each processing will be explained as follows.

Quantization feature vector input processing 301 is a processing of performing input of an input quantization feature vector and a dictionary quantization feature vector. The "quantization feature vector" is given as a set of array of the quantization value and array of the quantization number of each component.

Coefficient table generation processing 302 is a processing of generating a coefficient table from the array of each quantization value of the input quantization feature vector and the dictionary quantization feature vector.

The coefficient table which calculates the distance of the input quantization feature vector and the dictionary quantization feature vector is given by the following M×N matrix $C=(c_{ij})$, if the quantization number of each quantization feature vector is M and N, and two quantization values are $(q_1, \ldots, q_m)$ and $(r_1, \ldots, r_M)$, respectively.

$$C = (c_{ij}) = \begin{pmatrix} (q_1 - r_1)^2 & \ldots & (q_1 - r_N)^2 \\ \vdots & \ddots & \vdots \\ (q_M - r_1)^2 & \ldots & (q_M - r_N)^2 \end{pmatrix} \quad (2)$$

Coefficient addition processing 303 is a processing of calculating a set corresponding to each component from the array of the quantization number of the input quantization feature vector and the dictionary quantization feature vector and calculates a total of the values of the coefficient table corresponding to the set.

The following value as shown in equation (3) will be calculated if the dimension of the feature space is D and arrays of two quantization numbers are $(m_1, \ldots, m_D)$ and $(n_1, \ldots, n_D)$, respectively.

$$\sum_{i=1}^{D} c_{m_i n_i} \quad (3)$$

After the calculation, a root square of the above mentioned value is calculated and the calculated value will be set as the similarity, since the above mentioned value is a square value of the distance between vectors.

Output processing 304 is a processing of outputting the similarity obtained by coefficient addition processing 303.

According to this embodiment, the error caused by compression is suppressed by quantization of the input feature vector and the dictionary feature vector, and an amount of data may be compressed.

Since the error of the value defined between the input quantization feature vector before and after the compression and the dictionary quantization feature vector may be reduced and degradation of the recognition performance by compression may also be suppressed.

In similarity calculation processing 30, a similarity, which is the distance between the feature vectors in a compressed state without decompression, may be calculated

Second Embodiment

Figure 4:
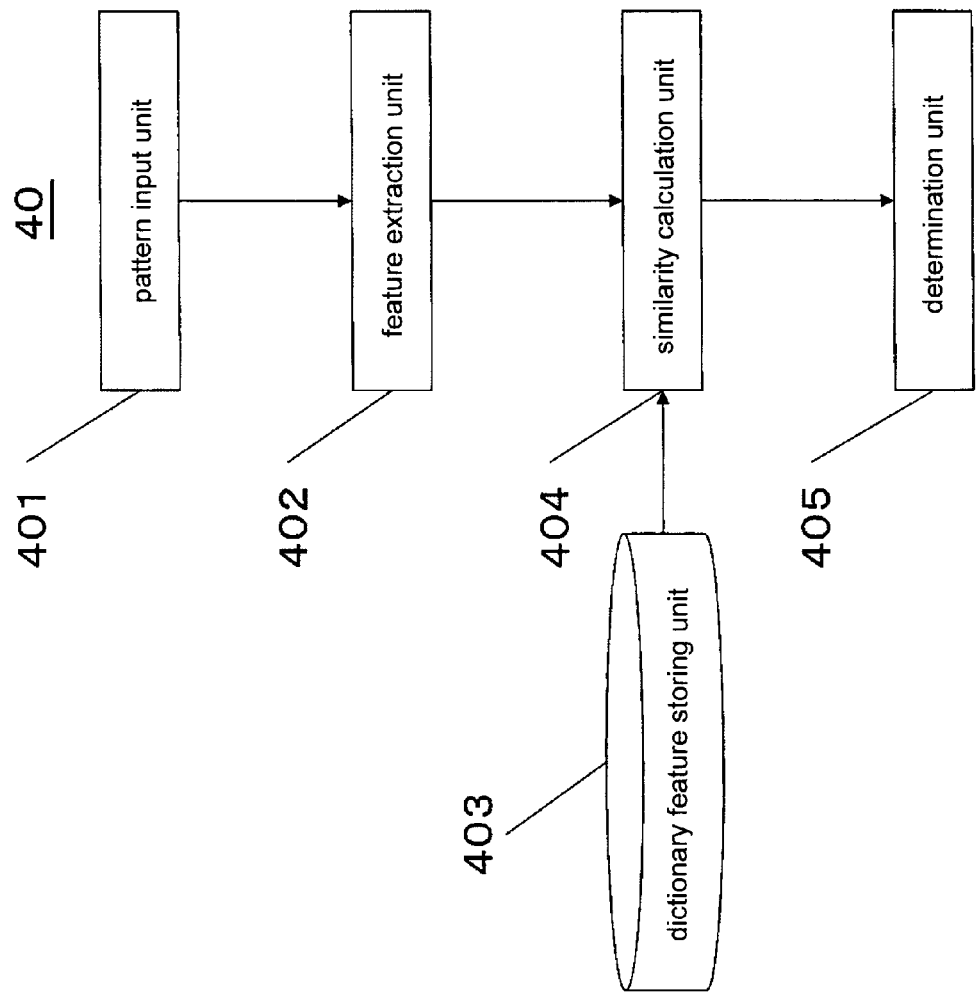
FIG. 4 is a block diagram of a pattern recognition apparatus according to the second embodiment of the invention.

Pattern recognition apparatus 40 of a second embodiment of this invention will be explained with reference to FIGS. 4 and 5. Pattern recognition apparatus 40 of this embodiment calculates the similarity from an input feature vector corresponding to an input pattern, and a dictionary quantization feature vector which is created by quantizing a dictionary feature vector to be compared and performs pattern recognition from the similarity.

Pattern recognition apparatus 40 of this embodiment will be explained with reference to FIG. 4. FIG. 4 is a schematic block diagram illustrating a pattern recognition apparatus 40. Pattern recognition apparatus 40 comprises a pattern input unit 401, a feature extraction unit 402, a dictionary feature memory storing unit 403, a similarity calculation unit 404 and a determination unit 405. Functions of each unit 401-405 may be realized by a program stored in a computer. Functions of each unit 401-405 will be explained below.

Pattern input unit 401 inputs the pattern to be used as a candidate for recognition. When the pattern is an image, an image captured by, for example, a digital camera may be input into a computer or an image captured by a camera connected to a computer may be input into the computer. When the pattern is a sound, for example, a recorded sound may be input into a computer or a sound recorded by a microphone connected to a computer may be input into the computer.

Feature extraction unit 402 extracts feature values from a pattern input by pattern input unit 401 and converts the pattern into a vector. Hereafter, the vector converted by feature extraction unit 402 is called a "feature vector." When the input pattern is an image, the pattern is changed into a vector by, for example, a raster scan. When the input pattern is a sound, for example, a vector which has frequency components of the sound within a definite period of time is used.

After converting into a vector, a processing of suppressing an input pattern change may be performed. For example, a processing of removing a noise component with a small eigen value obtained from the pattern prepared in large quantities beforehand by principal component analysis etc. may be performed.

Dictionary feature memory storing unit 403 performs a processing by feature extraction unit 402 and a quantization processing 20 for a pattern of each class for recognition and stores the obtained quantization feature vectors (hereinafter, referred to as "dictionary quantization feature vector") into a storage area.

Similarity calculation unit 404 calculates a value indicating a similarity between a quantization feature vector of the input pattern generated by feature extraction unit 402 (hereinafter, referred to as "input quantization feature vector") and a dictionary quantization feature vector of each class stored in dictionary feature memory storing unit 403. Here, the distance between vectors is calculated.

Figure 5:
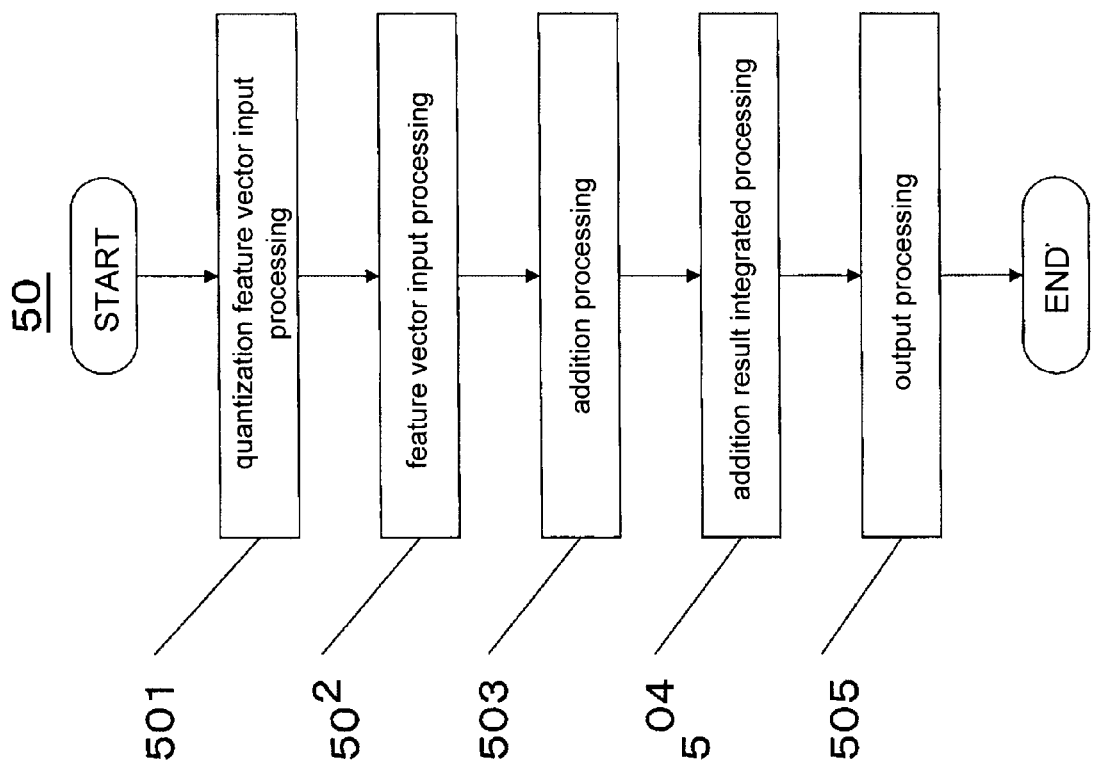
FIG. 5 is a flow chart of a similarity calculation processing.

FIG. 5 is a flow chart of a similarity calculation processing 50 performed by similarity calculation unit 404. Explanation of similarity calculation processing 50 is mentioned later.

Determination unit 405 identifies the class for recognition, when the class has the highest similarity among the registered classes fulfilling conditions of the similarity. When no class fulfills the conditions, determination unit 405 identifies that there is no class in the class. When the distance between vectors is used as the similarity, the distance is set to be smaller than a predetermined threshold and has higher similarity as the distance becomes smaller.

Similarity calculation processing 50 includes quantization feature vector input processing 501, feature vector input processing 502, addition processing 503 which is classified by quantization number, addition result integrated processing 504 and output process 505. The explanation of each processing is as follows.

Quantization feature vector input processing 501 is a processing of inputting dictionary quantization feature vector. Here, the dictionary quantization feature vector stored in dictionary feature memory storing unit 403 is input. The "quantization feature vector" is given as a set of array of the quantization value and array of the quantization number of each component.

Feature vector input processing 502 is a processing of inputting the input feature vector. Here, the input feature vector generated by feature extraction unit 402 is input.

Addition processing 503, which is classified by quantization number, is a processing of calculating $f_i, g_i, h_i$ as defined below for each i=1, ..., N, let the quantization number of the dictionary quantization feature vector which is input by quantization feature vector input processing 501 be N, array of quantization values be $(q_1, \ldots, q_N)$, array of quantization number of each component be $(n_1, \ldots, n_N)$ and the input feature vector input by feature vector input processing 502 be $(a_1, \ldots, a_D)$ ($A_i = \{j | n_j = i\}$).

$$f_i = \sum_{j \in A_i} 1 \qquad (4)$$

$$g_i = \sum_{j \in A_i} a_j \qquad (5)$$

$$h_i = \sum_{j \in A_i} a_j^2 \qquad (6)$$

Addition result integrated processing 504 is a processing of calculating the following values.

$$\sum_{i=1}^{N} (f_i q_i^2 - 2 g_i q_i + h_i)$$

After the calculation, a root square of the above mentioned value is calculated, since the above mentioned value is a square value of the distance between vectors.

Output process 505 is a processing of outputting the value obtained by addition result integrated processing 504.

According to this embodiment, the error caused by compression is suppressed by quantization of the input feature vector and the data may be stored in dictionary feature memory storing unit 403 in a compressed state. Since the error of the value defined between the input feature vector before and after compression and the dictionary feature vector may be small, and degradation of the recognition performance by compression may also be suppressed.

In similarity calculation processing 30, a similarity, which is the distance between the feature vectors in a compressed state without decompression, may be calculated.

Third Embodiment

Figure 6:
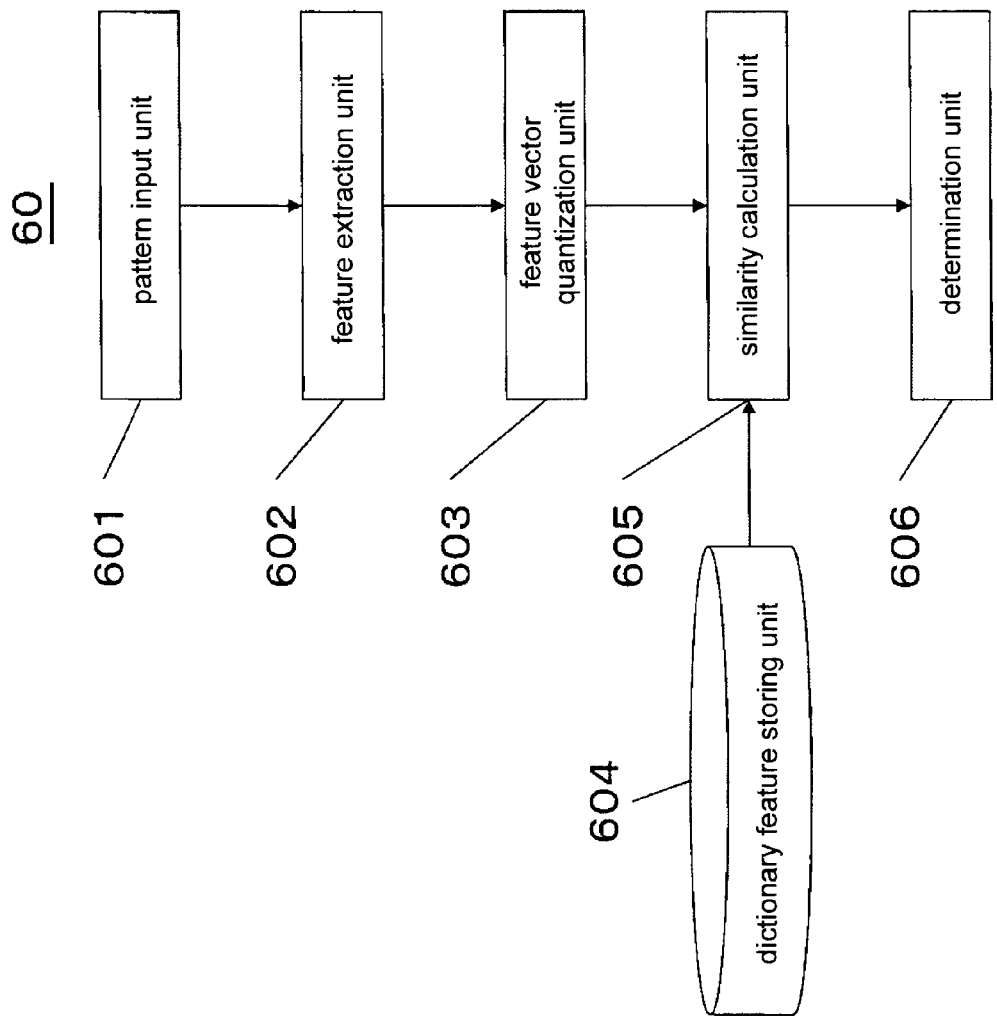
FIG. 6 is a block diagram of a pattern recognition apparatus of a third embodiment.

Pattern recognition apparatus 60 of a third embodiment of this invention will be explained with reference to FIGS. 6 and 7. Pattern recognition apparatus 60 comprises a pattern input unit 601, a feature extraction unit 602, a feature vector quantization unit 603, a dictionary feature storing unit 604, a similarity calculation unit 605, and a determination unit 606.

Functions of each unit 601-606 may be realized by a program stored in a computer. Functions of each unit 601-606 will be explained below.

Pattern input unit 601 inputs the pattern to be used as a candidate for recognition. When the pattern is an image, an image captured by, for example, a digital camera may be input into a computer or an image captured by a camera connected to a computer may be input into the computer. When the pattern is a sound, for example, a recorded sound may be input into a computer or a sound recorded by a microphone connected to a computer may be input into the computer.

Feature extraction unit 602 extracts feature values from a pattern input by pattern input unit 601 and converts the pattern into a vector. Hereafter, the vector converted by feature extraction unit 602 is called a "input feature vector." When the input pattern is an image, the pattern is changed into a vector by, for example, a raster scan. When the input pattern is a sound, for example, a vector which has frequency components of the sound within a definite period of time is used.

After converting into a vector, a processing of suppressing an input pattern change may be performed. For example, a processing of removing a noise component with a small eigen value obtained from the pattern prepared in large quantities beforehand by principal component analysis etc. may be performed.

Feature vector quantization unit 603 performs quantization processing of each component of the feature vectors of quantization processing 20 for the input feature vector generated by feature extraction unit 602. Hereinafter, a quantized input feature vector is referred to as "input quantization feature vector."

Dictionary feature storing unit 604 performs processing performed by feature extraction unit 602 for a pattern of each class for recognition and stores generated dictionary feature vectors (hereinafter, referred to as "dictionary feature vector") into a storage area.

Similarity calculation unit 605 calculates a value indicating a similarity between a input quantization feature vector of the input pattern output by feature vector quantization unit 603 and a dictionary quantization feature vector of each class stored in dictionary feature storing unit 604. Here, the distance between vectors is calculated as a similarity between vectors.

Determination unit 606 identifies the class for recognition, when the class has the highest similarity among the registered classes fulfilling conditions of the similarity. When no class fulfills the conditions, determination unit 606 identifies that there is no class in the class. When the distance between vectors is used as the similarity, the distance is set to be smaller than a predetermined threshold and has higher similarity as the distance becomes smaller.

According to this embodiment, the error caused by compression is suppressed by the above quantization of the input feature vector and an amount of data may be compressed.

Since a similarity between the input quantization feature vector before and after the compression and the dictionary quantization feature vector may be reduced and degradation of the recognition performance by compression may also be suppressed.

In the above similarity calculation processing of the quantization feature vector, a similarity, which is the distance between the feature vectors in a compressed state without decompression, may be calculated.

This invention is not limited to the above-mentioned embodiments but may be changed variously if it falls within the scope of the invention.

Quantization error $e_{i,j}$, which is used by initialization processing 203, quantization threshold search processing 204 and re-search preparation processing 206, may be calculated by the sum of the absolute value of the difference of each component.

In this case, the quantization error is given by the following equation (7) when replacing all components $v_i, \ldots, v_j$ with q ($v_i <= q_{l+1}$).

$$\sum_{k=i}^{j} |q - v_k| = \qquad (7)$$

$$\sum_{k=i}^{l} (q - v_k) + \sum_{k=l+1}^{j} (v_k - q) = (2l + 1 - (i + j))q - \sum_{k=i}^{l} v_k + \sum_{k=l+1}^{j} v_k$$

When i+j is even, the quantization error is at the minimum for $p=(i+j-1)/2$ and $q=v_p$. The minimum values are given by the following equation.

$$\sum_{k=p+1}^{j} v_k - \sum_{k=i}^{p-1} v_k$$

When i+j is odd, the quantization error is at the minimum for $p=(i+j-1)/2$. The minimum values are given by the following equation.

$$\sum_{k=p+2}^{j} v_k - \sum_{k=i}^{p-1} v_k$$

The above mentioned quantization value, which minimizes the quantization error between each of the quantization thresholds to be used, is used by quantization feature vector output processing 207.

The value of the Gaussian kernel equation (8) using the distance between two vectors as a similarity between the vectors calculated by similarity calculation unit 105 may be calculated.

$$\exp\left(\frac{\|x - x\|^2}{\sigma^2}\right) \qquad (8)$$

As a similarity between the vectors calculated by similarity calculation unit 105, the inner product of two vectors and its square may be calculated.

If a coefficient table defined by coefficient table generation processing 302 by equation (9) instead of equation (2) is generated when calculating the inner product between the quantization feature vectors, the inner product between vectors may be calculated.

$$C = \begin{pmatrix} q_1 r_1 & \cdots & q_1 r_N \\ \vdots & \ddots & \vdots \\ q_M r_1 & \cdots & q_M r_N \end{pmatrix} \qquad (9)$$

Values such as a polynomial kernel equation (10) using this inner product and equation (11) may also be a similarity between vectors, let (u, u') be an inner product of vector u and u', and p be one or more integers, the value of p be set by a suitable value by experiment.

$$(u,u')^p \quad (10)$$

$$((u,u')+1)^p \quad (11)$$

As a similarity between the vectors calculated by similarity calculation unit 105, sum of the absolute value of the difference of each of two components may be calculated. Hereafter, this value is referred to as L1 distance between vectors.

If the coefficient table defined by equation (12) instead of equation (2) by coefficient table generation processing 302 is generated when calculating L1 distance between the quantization feature vectors, L1 distance between vectors may be calculated (| | is taken as an absolute value).

$$C = \begin{pmatrix} |q_1 - r_1| & \cdots & |q_1 - r_N| \\ \vdots & \ddots & \vdots \\ |q_M - r_1| & \cdots & |q_M - r_N| \end{pmatrix} \quad (12)$$

As a similarity between the vectors calculated by similarity calculation unit 404, the inner product of two vectors and its square may be calculated. When calculating the inner product between the quantization feature vectors, the inner product between vectors may be obtained by calculating $g_i$ of equation (5) by addition processing 503 which is classified by quantization number, and calculating equation (13) by addition result integrated processing 504.

$$\sum_{i=1}^{N} g_i q_i \quad (13)$$

The value of the polynomial kernel equation (10) using this inner product and equation (11) may be used as a similarity between vectors.

As a similarity between the vectors calculated by similarity calculation unit 404, L1 distance may be calculated. When calculating L1 distance between the quantization feature vectors, $b_i$ which is defined as shown below by addition processing 503 which is classified by quantization number may be calculated (| | is taken as an absolute value.).

$$b_i = \sum_{j \in A_i} |q_i - a_j| \quad (14)$$

Next, L1 distance between vectors may be calculated by calculating equation (14) by addition result integrated processing 504.

$$\sum_{i=1}^{N} b_i \quad (15)$$

Lossless compression may be used when the quantization feature vector is stored in a storage area of dictionary feature storing unit 104 and dictionary feature memory storing unit 403. When lossless compression is carried out, the stored quantization feature vector is restored and used in similarity calculation unit 105.

For example, Huffman encoding (T. M. Cover and J. A. Thomas and Elements of information Theory.NewYork:Willey.2006 reference) etc. may be used as lossless compression.

What is claimed is:

1. A pattern recognition apparatus comprising:
   a pattern input unit configured to input a pattern of a recognition object;
   a feature extraction unit configured to perform feature extraction from the input pattern to generate a feature vector;
   a function generation unit configured to increase the number of quantization in an order from quantization number 1 or quantization number 2 to calculate a quantization threshold of each of the quantization number, the function generation unit calculating the quantization threshold of quantization number (n+1) using a quantization threshold of quantization number n (n>=1) and generating a quantization function having a quantization threshold corresponding to quantization number S (S>n);
   a quantization unit configured to quantize each component of the feature vector of the input pattern using the quantization function to generate an input quantization feature vector having each of the quantized component;
   a dictionary feature storing unit configured to store a dictionary feature vector of the recognition object, or a quantized dictionary feature vector in which each component of the dictionary feature vector of the pattern of a recognition object is quantized;
   a calculation unit configured to calculate a similarity between the input quantization feature vector and the dictionary feature vector, or a similarity between the input quantization feature vector and the quantized dictionary feature vector; and
   a determination unit configured to recognize the recognition object based on the similarity.

2. The apparatus according to claim 1, wherein the similarity calculation unit calculates the similarity using the input quantization feature vector which comprises a quantization value and a quantization number of each component, and the dictionary quantization feature vector which comprises a quantization value and a quantization number of each component.

3. The apparatus according to claim 1, wherein the similarity calculation unit calculates the similarity using the input quantization feature vector which comprises a quantization value and a quantization number of each component, and the dictionary feature vector.

4. A pattern recognition apparatus comprising:
   a pattern input, unit configured to input a pattern of a recognition object;
   a feature extraction unit configured to perform feature extraction from the input pattern to generate an input feature vector;
   a dictionary feature storing unit configured to store a quantized dictionary feature vector of the recognition object;
   a similarity calculation unit configured to calculate a similarity between the input feature vector and the quantized dictionary feature vector; and
   a determination unit configured to recognize the recognition object based on the similarity, wherein the dictionary feature storing unit includes:
     a dictionary input unit configured to input a dictionary pattern of the recognition object;
     a feature extraction unit configured to perform feature extraction from the input pattern to generate a feature vector;

a function generation unit configured to calculate a quantization threshold of each of the quantization number, the function generation unit calculating the quantization threshold of quantization number (n+1) using a quantization threshold of quantization number n (n>=1) and generating a quantization function having a quantization threshold corresponding to quantization number S (S>n);

a quantization unit configured to quantize each component of the feature vector of the dictionary pattern using the quantization function to generate an dictionary quantization feature vector having each of the quantized component; and a dictionary feature storing unit configured to store the quantized dictionary feature vector.

5. The apparatus according to claim 1 or 4, wherein the function generation unit includes:

a selecting unit configured to select one component from a set of a plurality of components of the feature vector;

a dividing unit configured to divide the group into two groups using the selected component as a border;

a first operation unit configured to calculate a first quantization error when quantizing one of the divided set of the components into quantization number 1;

a second operation unit configured to calculate a second quantization error when quantizing the other of the divided set of the components into quantization number n based on the quantization threshold and the first quantization error calculated on quantization number n−1;

a third operation unit configured to add the first quantization error and the second quantization error to calculate a quantization error of the quantization number n+1; and a fourth operation unit configured to calculate a division value of the quantization threshold corresponding to a quantization error of the quantization number n+1.

6. The apparatus according to claim 5, wherein the first quantization error is the minimum quantization error when quantizing one of the divided set of the components into quantization number 1, the second quantization error is the minimum quantization error when quantizing the other of the divided set of the components into quantization number n.

7. The apparatus according to claim 5, wherein the function generation unit arranges a value of each component of the input feature vector in an ascending order based on a magnitude of each value.

8. The apparatus according to claim 5, wherein a function generation unit outputs a quantization function in a case where the quantization error is smaller than a predetermined value or the quantization number S coincide with a predetermined value to the quantization unit.

9. The apparatus according to claim 4, wherein the similarity calculation unit calculates the similarity using the quantized dictionary feature vector which comprises a quantization value and a quantization number of each component, and the input feature vector.

10. The apparatus according to claim 1 or 4, wherein the dictionary feature storing unit stores lossless compression of the dictionary quantization feature vector.

11. A pattern recognition method comprising steps of:

inputting a pattern of a recognition object;

performing feature extraction from the input pattern to generate a feature vector;

increasing the number of quantization in an order from quantization number 1 or quantization number 2 to calculate a quantization threshold of each of the quantization number, wherein the quantization threshold of quantization number (n+1) using a quantization threshold of quantization number n (n>=1) is calculated and a quantization function having a quantization threshold corresponding to quantization number S (S>n) is generated;

quantizing each component of the feature vector of the input pattern using the quantization function to generate an input quantization feature vector having each of the quantized component;

storing a dictionary feature vector of the recognition object, or a quantized dictionary feature vector in which each component of the dictionary feature vector of the pattern of a recognition object is quantized;

calculating a similarity between the input quantization feature vector and the dictionary feature vector, or a similarity between the input quantization feature vector and the quantized dictionary feature vector; and recognizing the recognition object based on the similarity.

12. A pattern recognition method comprising steps of:

inputting a pattern of a recognition object;

performing feature extraction from the input pattern to generate an input feature vector;

storing a quantized dictionary feature vector of the recognition object;

calculating a similarity between the input feature vector and the quantized dictionary feature vector; and recognizing the recognition object based on the similarity, wherein the storing step includes:

inputting a dictionary pattern of the recognition object;

performing feature extraction from the input pattern to generate a feature vector;

calculating a quantization threshold of each of the quantization number, wherein the quantization threshold of quantization number (n+1) using a quantization threshold of quantization number n (n>=1) is calculated and a quantization function having a quantization threshold corresponding to quantization number S (S>n) is generated;

quantizing each component of the feature vector of the dictionary pattern using the quantization function to generate an dictionary quantization feature vector having each of the quantized component; and storing the quantized dictionary feature vector.

13. A non-transitory computer-readable medium storing a pattern recognition program configured to perform steps of:

inputting a pattern of a recognition object;

performing feature extraction from the input pattern to generate a feature vector;

increasing the number of quantization in an order from quantization number 1 or quantization number 2 to calculate a quantization threshold of each of the quantization number, wherein the quantization threshold of quantization number (n+1) using a quantization threshold of quantization number n (n>=1) is calculated and a quantization function having a quantization threshold corresponding to quantization number S (S>n) is generated;

quantizing each component of the feature vector of the input pattern using the quantization function to generate an input quantization feature vector having each of the quantized component;

storing a dictionary feature vector of the recognition object, or a quantized dictionary feature vector in which each component of the dictionary feature vector of the pattern of a recognition object is quantized;

calculating a similarity between the input quantization feature vector and the dictionary feature vector, or a similarity between the input quantization feature vector and the quantized dictionary feature vector; and recognizing the recognition object based on the similarity.

14. A non-transitory computer-readable medium storing a pattern recognition program configured to perform steps of:
inputting a pattern of a recognition object;
performing feature extraction from the input pattern to generate an input feature vector;
storing a quantized dictionary feature vector of the recognition object;
calculating a similarity between the input feature vector and the quantized dictionary feature vector; and
recognizing the recognition object based on the similarity;
wherein the storing step includes:
inputting a dictionary pattern of the recognition object;
performing feature extraction from the input pattern to generate a feature vector;
calculating a quantization threshold of each of the quantization number, wherein the quantization threshold of quantization number (n+1) using a quantization threshold of quantization number n (n>=1) is calculated and a quantization function having a quantization threshold corresponding to quantization number S (S>n) is generated;
quantizing each component of the feature vector of the dictionary pattern using the quantization function to generate an dictionary quantization feature vector having each of the quantized component; and
storing the quantized dictionary feature vector.

* * * * *